Figure 1:
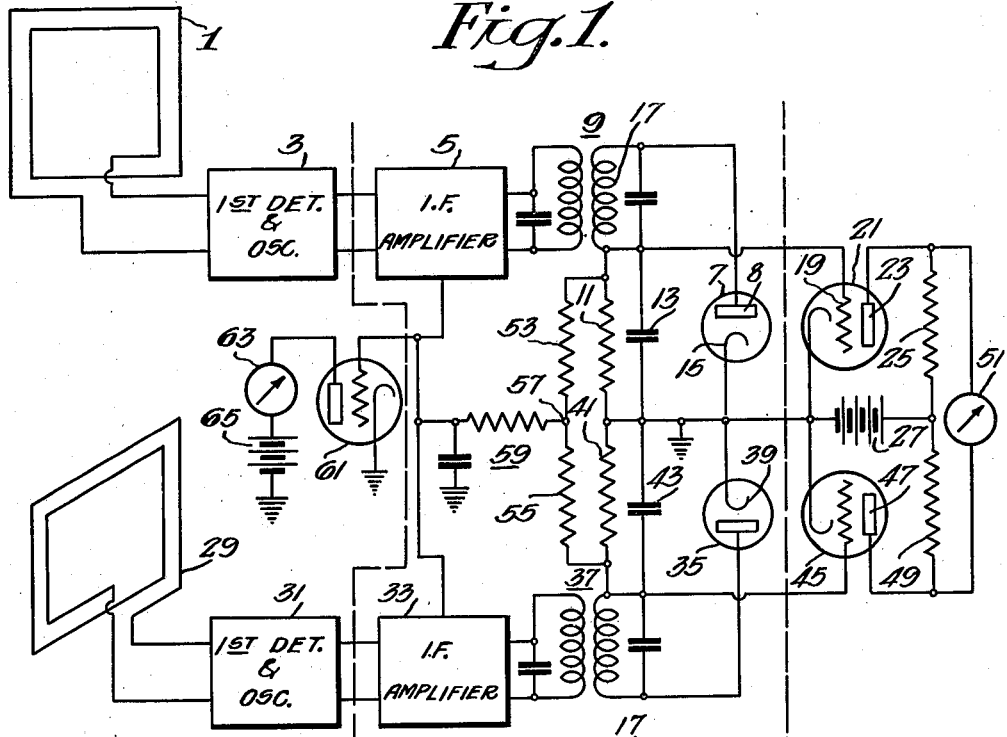

Dec. 24, 1940.  R. A. BRADEN  2,226,366
AUTOMATIC VOLUME CONTROL
Filed Dec. 30, 1938

Inventor
Rene A. Braden
By
Attorney

Patented Dec. 24, 1940

2,226,366

UNITED STATES PATENT OFFICE 2,226,366

AUTOMATIC VOLUME CONTROL

Rene A. Braden, Collingswood, N. J., assignor to Radio Corporation of America, a corporation of Delaware Application December 30, 1938, Serial No. 248,559

3 Claims. (Cl. 250—20)

This invention relates to automatic volume control systems and, more particularly, to the application of an automatic volume control potential to a differential receiver.

By the term "differential receiver," as used in this application, is meant a receiver which may be used to indicate changes in the relative intensity of signals originating from separate points, or to indicate changes in the relative intensity of signals separately received, but originating from a single point. Such a receiver would be one in which, for example, energy is transmitted over a pair of beams, separately received, and the resultant currents balanced against each other, so that no indication is given until the amplitude of one of the beams departs from a predetermined relation to the amplitude of the other. Such systems have been suggested for use in detecting the presence of foreign objects.

Another illustration of the use of a differential receiver is the one illustrated in this application which consists of a pair of crossed loop antennas which receive signals whose relative amplitudes depend upon the orientation of the loops. This type of receiver is frequently used as a direction finder or left-right aircraft indicator.

It is frequently desirable to provide a receiver of this type with an automatic volume control system which does not affect the ability of the receiver to indicate changes from the normally balanced condition. It is apparent that it would not be practical to use separate automatic volume controls on each receiver, since the effect of this would be to prevent the change in output which is desired as an indication of changes in the relative input.

It is proposed in accordance with a preferred embodiment of this invention, therefore, to control the amplification of each of the signals by means of a control bias voltage which is developed in a circuit in which the potentials due to the two signals are added. Thus, the control bias will regulate the receiving systems to give a constant total output. If the amplitudes of the received signals increase or decrease in the same proportion, the amplification in each system changes accordingly, so that the output remains constant. If, however, the intensity of the signal from one antenna is reduced while that from the other remains constant, the automatic control operates to increase the amplification of both systems.

Increasing the gain of both channels by the automatic volume control does not reduce the sensitivity of the differential receiver to changes in the relative intensity of the signals.

Since the relative amplification of the two channels remains constant, changes in the input are still proportional to changes in the relative input, assuming, of course, a linear amplifier and detector.

In an alternative embodiment of my invention I have provided an automatic volume control system which develops a control voltage only from the signal having the greatest intensity. The advantage of this system is that the output can never exceed a predetermined value regardless of changes in the relative input. Consequently, output tubes can be designed to operate normally at full output, thus increasing their efficiency and decreasing their size.

Among the objects of this invention are to provide an automatic volume control for a differential receiver; to provide an automatic volume control for a directional receiver which does not affect its directivity; to provide an automatic volume control voltage in a differential receiver which varies as a function of the sum of the received signals; to provide means for indicating the presence of an automatic volume control voltage, and its amplitude; and to provide an automatic volume control voltage which varies in accordance with the signal having the greatest amplitude.

This invention will be better understood from the following description when considered in connection with the accompanying drawing. Its scope is indicated by the appended claims. Referring to the drawing Figure 1 illustrates a preferred embodiment of this invention, and Figure 2 illustrates a modification thereof.

Figure 2:
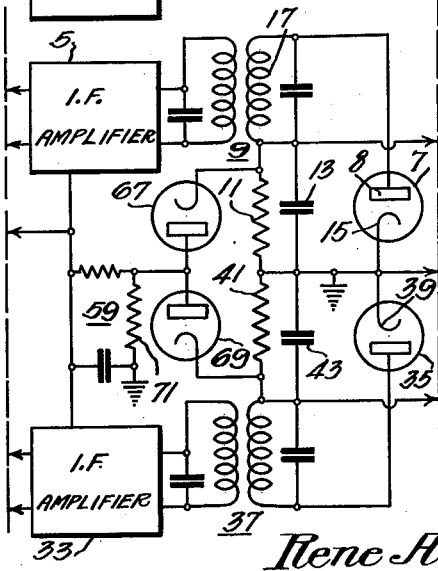

Referring to Fig. 1, a loop antenna 1 is connected to the input of a receiver which includes a first detector and oscillator 3 and an intermediate frequency amplifier 5. The output of the intermediate frequency amplifier 5 is connected to the primary of a transformer 9. One terminal of the secondary 17 of this transformer is connected to the anode electrode 8. A diode load resistor 11 and a carrier frequency bypass capacitor 13 are connected between the cathode 15, of the diode 7, and the other terminal of the secondary 17 of the transformer 9. The rectified voltage which is developed across the diode load resistor 11 is impressed on the grid 19 of an amplifier 21 whose anode 23 is connected through an anode load resistor 25 to a source of positive potential, such as battery 27, or the like. The circuit so far described constitutes the first receiving channel.

The second receiving channel consists of a loop antenna 29 which is connected to the input of a second receiving system which includes a first detector and oscillator 31 and an intermediate frequency amplifier 33, which is coupled to a diode rectifier 35 through an intermediate frequency transformer 37. The cathode 39 is connected to cathode 15 and to ground. Rectifier 35 is also provided with a diode load resistor 41 and a bypass capacitor 43 which are connected in parallel between ground and the secondary of the transformer 37. The rectified voltage developed across diode load resistor 41 is impressed on the grid of an amplifier 45 whose anode 47 is connected to battery 27 through an anode load resistor 49.

It is thus seen that the system comprises separate input channels for the currents received by the two antennas, and when the orientation of the loops 1 and 29 is such that currents of equal amplitude are received, similar voltages are impressed on the two rectifiers 7 and 35, and similar rectified voltages, with respect to ground, will be produced across the respective diode load resistors 11 and 41. Consequently, identical direct current potentials will be applied to the grid electrodes of the amplifiers 21 and 45. By selecting anode load resistors of equal value, the potential of the anodes 23 and 47 will likewise be identical.

A zero-center meter 51 is connected between the two anodes. Since it is connected between points which are normally at equal potential, no deflection will be observed until such time as a potential difference exists between the two anodes. This will take place when unequal voltages are applied to the grids of the amplifiers 21 and 45. It is apparent that this will be accomplished by rotating one or both of the loop antennas.

The automatic volume control potential is obtained by means of a connection to the junction 57 of two serially connected resistors 53 and 55, which are connected in parallel with resistors 11 and 41. The connection may include a resistance-capacitance filter 59. The automatic volume control voltage available at the junction 57 is impressed on one or more of the intermediate frequency amplifier tubes in both amplifiers 5 and 33. The application of this control voltage is well known to the art and need not be described in detail.

Having described the construction of this embodiment of my invention, its operation will now be explained. When the loop antennas 1 and 29 are mutually at right angles, they may be so oriented with respect to a transmitting station that currents of equal amplitude are impressed on the two receiving channels. The gain of the intermediate frequency amplifier 5 is preferably the same as that of amplifier 33, and the system is preferably balanced so that the potential across the terminals of meter 51 is normally zero. Each time the amplitude of the transmitted signal increases or decreases or, on the other hand, if the differential receiver approaches or departs from the transmitter, the amplitude of both received signals will change similarly. This change will not upset the balance existing at the receiver output, and the meter deflection will not change. However, the potential of the rectified voltage across resistors 11 and 41 will change in the same direction and by a like amount, so that the potential of junction 57, with respect to ground, will likewise change. The resultant voltage is then impressed on the intermediate frequency amplifiers in such a polarity as to oppose the change, as is well known.

Assuming that both loops are rotated so that the current in loop 1 increases while that in loop 29 decreases by a like amount, the potential developed across diode load resistor 11 causes the grid of amplifier 21 to become more negative, while the potential developed across diode load resistor 41 becomes less negative, thus impressing a more positive voltage on the grid of amplifier 45. As a result, the anode potential of tube 21 increases, while that of tube 45 decreases and the meter 51 is deflected an amount corresponding to the potential difference. The potential of junction 57 represents the average of the two potentials developed by the two diode rectifiers, and, therefore, remains constant. As a result, the automatic volume control bias does not change.

Assuming that but one loop is rotated so that the signal amplitude is increased and the potential developed across resistor 11 becomes more negative while that developed across resistor 41 remains constant, the control potential which is developed is applied to both receiving channels and consequently the amplification of both is decreased. The decrease in amplification in the channel which is connected to the loop which was rotated tends to oppose the change, but this is compensated by the similar change in the amplification of the other channel, so that a resultant deflection is produced which is a true indication of the original change.

It is frequently desirable to be able to indicate the degree of control exercised by the automatic biasing voltage. This may be conveniently accomplished by applying the control voltage to the grid of a triode 61 which has a direct current meter 63 connected between the anode of the tube and the positive anode supply potential 65.

A modification of this invention is illustrated in Fig. 2, which shows only that portion of Fig. 1 between the dashed lines which is affected by the change.

Referring to Fig. 2, it is seen that the differential receiver circuit is identical with that shown in Fig. 1. Resistors 53 and 55 have been replaced by a pair of diode rectifiers 67 and 69 having their anode electrodes connected together and through a resistor 71 to ground, and having their cathode electrodes connected respectively to outer terminals of resistors 11 and 41. The automatic volume control voltage is taken from the anode electrodes of rectifiers 67 and 69 through a filter network 59, as before.

Assuming that the rectified voltage developed across diode resistor 11 is greater than that developed across diode resistor 41, the cathode of diode 67 will be made negative and a current will flow through the resistor 71 and diode 67. A negative voltage will therefore be impressed on the anode electrode of diode 69 which effectively biases it so that no current can flow. As a result, the automatic volume control voltage which is developed across resistor 71 is dependent upon the signal in the first channel. When the amplitude of the signal in the second channel has a greater amplitude, the first diode 67 will in turn be biased off.

As before, the gain of both channels is changed by the control voltage and therefore the relative amplification remains constant, so that changes in the relative input still produce an indication in the output. At the same time the load on the output tubes can never exceed a predetermined maximum and the tube may be operated continuously at a value near its rated maximum output.

While this invention has a particularly useful application to differential receivers operating in conjunction with directional antennas, as illustrated, it is apparent that the system may be applied to any differential system which operates in response to the relative change of any two currents, regardless of their source.

I claim as my invention:

1. In a device of the character described, a pair of input channels receptive to currents whose relative intensities are to be indicated, a pair of rectifiers, means connecting said rectifiers to said channels, means including said rectifiers for producing voltages respectively proportional to the amplitude of currents in said channels, a pair of resistors serially connected between said means for producing said voltages, a connection from the midpoint of said resistors to each of said input channels, means for indicating changes in the relative intensities of said signals, and means for indicating changes in the potential at said midpoint.

2. In a device of the character described, a pair of input channels receptive to currents whose relative intensities are to be indicated, a pair of rectifiers, means connecting said rectifiers to said channels, means including said rectifiers for producing voltages respectively proportional to the amplitude of currents in said channels, a second pair of rectifiers serially connected in opposition between said means for producing said voltages, and a connection from the midpoint of said second pair of rectifiers to each of said input channels.

3. In a device of the character described, a pair of input channels receptive to currents whose relative intensities are to be indicated, a pair of rectifiers, means connecting said rectifiers to said channels, means including said rectifiers for producing voltages respectively proportional to the amplitude of currents in said channels, a second pair of rectifiers serially connected in opposition between said means for producing said voltages, a connection from the midpoint of said second pair of rectifiers to each of said input channels, and means for indicating changes in the relative intensities of said signals.

RENE A. BRADEN.